United States Patent
Kirk et al.

[11] Patent Number: 5,184,574
[45] Date of Patent: Feb. 9, 1993

[54] CAT LITTER BOX

[76] Inventors: Robert C. Kirk; Stacey R. Kirk, both of 3000 SW. Scenic Dr. Ct., Portland, Oreg. 97225

[21] Appl. No.: 810,709

[22] Filed: Dec. 18, 1991

Related U.S. Application Data

[63] Continuation-in-part of Ser. No. 631,350, Dec. 20, 1990, abandoned.

[51] Int. Cl.$^5$ .................... A01K 29/00; A01K 1/015
[52] U.S. Cl. .................... 119/162; 119/166; 119/171
[58] Field of Search ............... 119/161, 162, 165, 166, 119/163, 171; 4/323, 455, 460, 222.1, 290, 291, DIG. 19

[56] References Cited

U.S. PATENT DOCUMENTS

| | | | |
|---|---|---|---|
| 405,182 | 6/1889 | Riker | 4/455 |
| 2,144,329 | 1/1939 | Conlon et al. | 119/161 |
| 2,883,963 | 4/1959 | Scott | 119/161 |
| 3,332,397 | 7/1967 | Vander Wall | 119/166 |
| 3,339,527 | 9/1967 | Burroughs | 119/169 |
| 3,818,865 | 6/1974 | Sinclair | 119/161 |
| 3,965,863 | 6/1976 | Scott | 119/161 |
| 4,217,857 | 8/1980 | Geddie | 119/166 |
| 4,326,481 | 4/1982 | Gruss | 119/171 |
| 4,649,578 | 3/1987 | Vargo | 119/161 |
| 4,660,506 | 4/1987 | Nalven | 119/163 |

FOREIGN PATENT DOCUMENTS

| | | | |
|---|---|---|---|
| 1198683 | 12/1985 | Canada | 119/165 |
| 259293 | 5/1988 | European Pat. Off. | 119/166 |
| 2530923 | 2/1984 | France | 119/166 |
| 2630295 | 10/1989 | France | 119/161 |
| 451373 | 5/1950 | Italy | 119/165 |
| 8102536 | 12/1982 | Netherlands | 119/166 |
| 269601 | 4/1927 | United Kingdom | 4/290 |
| 2100569 | 1/1983 | United Kingdom | 119/171 |

*Primary Examiner*—Gene Mancene
*Assistant Examiner*—Todd E. Manahan
*Attorney, Agent, or Firm*—Chernoff, Vilhauer, McClung & Stenzel

[57] ABSTRACT

A cat litter box includes a tray on which the litter is deposited with the tray being inset within a base having inwardly converging bottom walls defining a sump for the collection of liquid waste. A valve is carried by the bottom walls and has a control rod extending outwardly through a base skirt to receive a handle. The litter is of a nonabsorbent type having a smooth exterior surface to facilitate cleaning. The base supports the tray both for cleaning when in place on the rim of a toilet bowl and when on a floor surface.

5 Claims, 3 Drawing Sheets

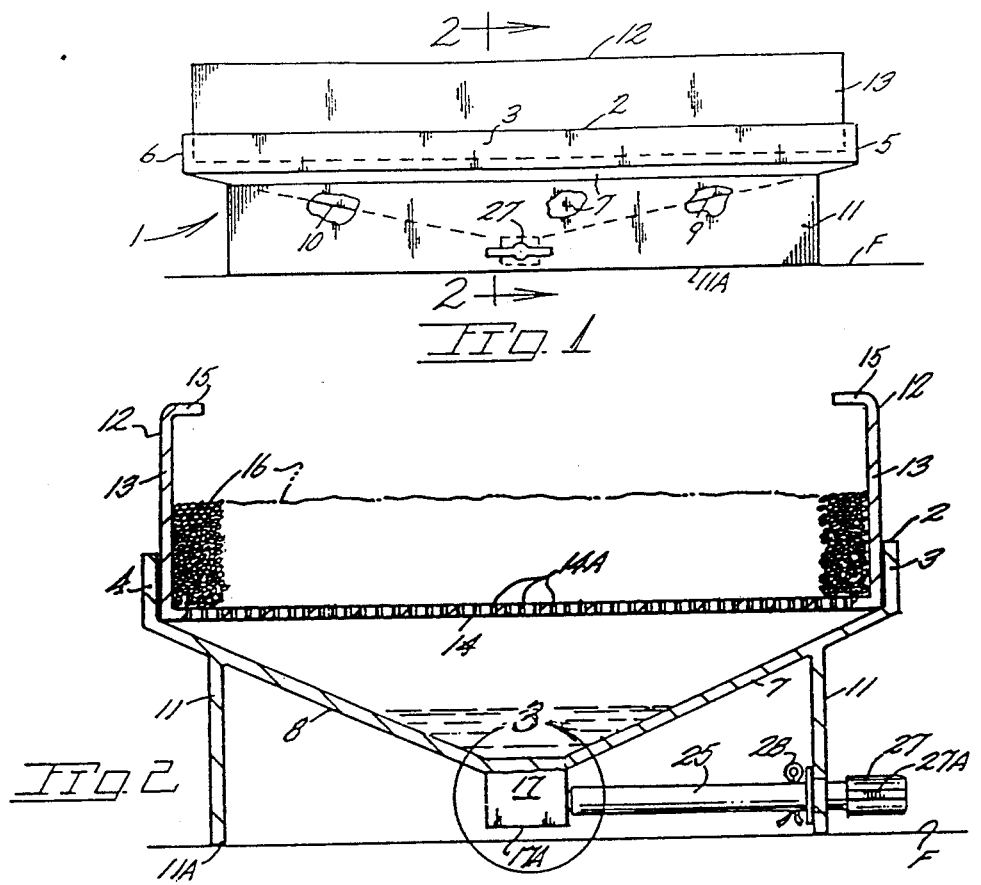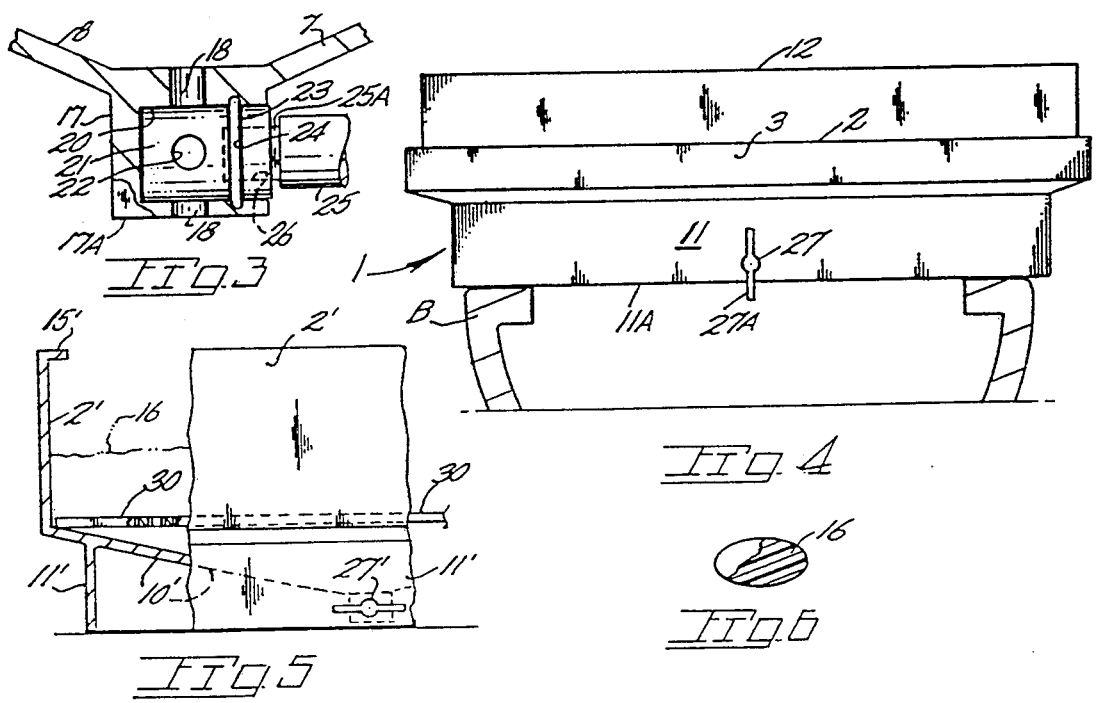

CAT LITTER BOX

This application is a continuation-in-part of U.S. patent application Ser. No. 07/631,350, filed Dec. 20, 1990, now abandoned.

BACKGROUND OF THE INVENTION

The present invention concerns litter boxes of the type used in the home for the reception of liquid and solid waste matter.

In wide use are receptacles filled with particulate, usually absorbent, which absorbs liquid waste and receives solid waste matter. Regular cleaning of such receptacles is an arduous, disagreeable task in that the saturated material and solid waste must be removed and the receptacle cleaned and recharged with fresh, absorbent material.

U.S. Pat. No. 4,444,148 discloses a litter box using particulate coated with wax to inhibit absorbency to permit liquid waste to pass downwardly to collection tray which may be provided with absorbent sheet material such as newsprint which eventually must be removed when saturated during a cleaning operation. The coated granules are formed from waste material e.g., ground corn cob, and treated with a wax coating. Other granular material is proposed which is also coated to retard absorbency.

U.S. Pat. No. 2,971,493 discloses a litter box comprised of inner and outer boxes with the inner box provided with a layer of filtering material such as sand while the lower box serves to collect liquid waste.

A problem exists in known litter boxes in that they present a difficult task in periodical treating of same in that a mass of saturated particulate must be disposed of, the container cleaned and the box recharged with fresh, absorbent material. Further, it is desireable that solid waste be periodically separated and removed from the absorbent material between those instances where the litter material is removed and replaced.

SUMMARY OF THE PRESENT INVENTION

The present invention provides a solution to the previously described problems by providing a portable cat litter box including a collection area for liquid waste with valve means for periodically discharging such waste.

A litter box according to the present invention includes a tray having a perforate bottom on which a quantity of particulate material is supported with the particulate preferably being of a nonabsorbent, synthetic material. Such material serves to receive solid waste as well as permit the flow of liquid waste downwardly through the perforate bottom into a collection site in a base supporting the tray. The particulate reduces vaporization and serves also as an odor barrier.

In the preferred embodiment of the invention the collection site is serviced by a valve actuated by a control located outwardly of the base. In such an embodiment of the invention a wall of the base supports the litter box in a stable manner both in place on a floor surface and when temporarily positioned for liquid waste disposal and cleaning, as for example on a toilet bowl. The control is preferably disposed proximate the floor surface to prevent accidental valve opening. Accordingly, without requiring any disassembly, the entire litter box can be placed atop an ordinary toilet, after which the valve can be opened to drain liquid waste into the toilet for discharge into the sewer system. Additionally, the non-absorbent litter can at that time be rinsed clean, with any previously-adhered material similarly being washed through the sump and proceeding through the open valve into the toilet for disposal.

Important objectives of the invention include the provision of a readily cleaned cat litter box having a base providing a collection site or sump which may be periodically drained via a valve having a control disposed adjacent a wall of the litter box base; the provision of a litter box wherein a tray is charged with particulate of a nonabsorbent homogeneous nature which permits passage of liquid waste downwardly into the valve equipped collection site; the provision of a cat litter box including a particulate filler of a smooth, nonporous, nonabsorbent material which serves to receive liquid and solid wastes and provide for convenient separation of same; and provision of an improved litter box which minimizes the vaporization of liquid wastes by the use of smooth, nonabsorbent plastic pellets which provide a barrier to odors and evaporation from a collection site.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a front elevational view of the present litter box.

FIG. 2 is a vertical sectional view taken along line 2—2 of FIG. 1.

FIG. 3 is an enlarged fragmentary view of the portion of FIG. 2 encircled at 3.

FIG. 4 is a front elevational view of the cat litter box temporarily in place on a toilet bowl for cleaning purposes.

FIG. 5 is a fragmentary elevation view of a modified cat litter box wherein a litter receiving tray is of reduced height.

FIG. 6 is an enlarged elevational view of a cat litter pellet for the present litter box.

DETAILED DESCRIPTION OF THE PREFERRED EMBODIMENTS

Figure 7:
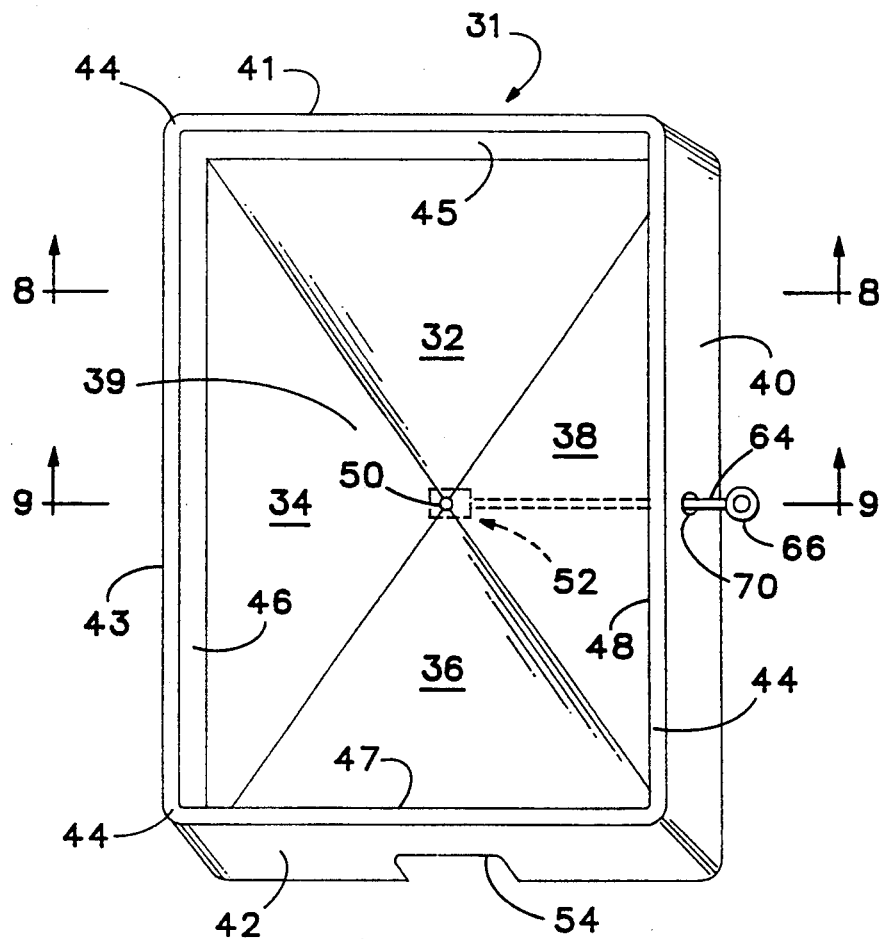
FIG. 7 is a perspective view of an alternative embodiment of the base portion of the present invention with handle for controlling the valve and illustrating an alternative handhold.

With continuing attention to the drawings wherein applied reference numerals indicate parts similarly hereinafter identified, the reference numeral 1 indicates generally a base of the present litter box.

The base includes a wall 2 about its perimeter which includes front and rear walls 3 and 4 along with end walls 5 and 6. The walls comprising wall 2 each merge downwardly with a respective one of inwardly inclined bottom walls 7, 8, 9 and 10 which provide a convenient surface for grasping and carrying of the litter box.

A support wall or skirt 11 is integral with the above-mentioned inclined bottom walls and provides a stable support for base 1. Support wall 11 terminates downwardly in a continuous lower edge 11A.

A tray 12 of the present litter box is a walled structure with an outer wall 13. The tray 12 is supported in the base 1, within base wall 2, and serves to receive a layer of particulate 16 on a perforate bottom wall 14. The tray terminates upwardly in a rim 15 having an inwardly turned continuous lip to prevent scattering of the particulate by the pet. Tray 12 is of a size as to seat within base wall 2 on the inclined walls of the base. If so desired the wall 2 of the base may be internally shouldered to support the tray in a spaced manner above the inclined bottom walls of the base. The tray bottom 14 is of perforate construction having a multitude of openings 14A of lesser size than the smallest dimension of the particulate material for particulate retention.

A preferred particulate is of synthetic, nonabsorbent plastic having a smooth exterior which is currently marketed in dry goods stores in pellet form for use as doll stuffing. Such particulates are of elliptical shape, as shown in FIG. 6, having a longest dimension of approximately one quarter inch. Other pellet configurations and sizes would also be suitable.

The convergent walls 7, 8, 9, and 10 of the base terminate downwardly to support a valve body 17 defining a discharge passageway 18. Valve body 17 also defines a valve seat 20 which carries a rotatable member 21, shown as being of the plug type, having an opening 22 for communication with passageway 18. A seal at 23 may be an O-ring retained within a groove 24 extending about valve member 21. Other valve types may be utilized such as, for example, a ball valve.

A valve control rod 25 engages member 21 to impart rotational movement thereto. For this purpose control rod 25 is provided with an end 25A for inserted locked engagement with corresponding socket 26 in member 21. Control rod end 25A may have a flat surface for driving engagement with plug member 21. Rod 25 terminates outwardly to locate a handle 27 in a highly accessible manner outwardly adjacent support wall 11 and front wall 3. To facilitate assembly and retention of the valve means above described, control rod 25 may be apertured to receive a cotter pin 28 to prevent undesired axial movement of the rod. Handle 27 is preferably proximate a floor surface F and includes an appendage 27A such as a wing or arm which, upon arcuate movement, as in the case of rotation of the handle 27, would come into contact with the floor surface F to prevent opening of the valve 17 and inadvertent waste discharge from the base. To prevent contact with the floor, a valve bottom wall 17A is offset upwardly from a plane containing wall edge 11A.

A modified litter box is disclosed in FIG. 5 wherein a tray at 30 is generally flat while a base wall 2' is of adequate height to confine the litter against discharge. Prime reference numerals in FIG. 5 indicate parts corresponding to parts earlier identified with like base reference numerals.

In FIG. 4 the litter box 1 is shown in place for cleaning purposes as for example on a toilet bowl B to permit the base to be emptied of liquid waste via valve 17. It will be noted that the control handle 27 is easily accessible and can be rotated without interference when the base is so located. Further, cleaning of the litter box may entail the application of a forceful water flow to the particulate tray 13 or 30 and the particulate. Since the particulate is nonporous with a smooth surface, it will readily release any surface deposits thereon and allow the washing away of solid waste matter not earlier removed such as by sifting of the particulate with a hand held device available for such purposes.

FIGS. 7 through 10 illustrate portions of another alternative embodiment of a base portion of a cat litter box arrangement according to the present invention. As best seen in FIG. 7, a base 31, which may be of molded plastic material, contains integral bottom walls 32, 34, 36 and 38 that slope downwardly toward one another defining a sump 39 in which an opening 50 is located. Base 31 further includes end walls 41 and 42, front wall 40 and rear wall 43. Walls 40, 41, 42, and 43 are interconnected with one another, extending upwardly and being interconnected with a generally horizontal continuous rim 44. The tray 12 (shown in FIGS. 1, 2, and 4) rests on the base 31 in the same way in which it rests on the base 1, with the inner walls 45, 46, 47, and 48 surrounding a lower portion of the tray 12 when it is in place. Walls 40, 41, 42, and 43 thus serve as support walls comparable to the support wall 11 shown in FIGS. 1, 2, and 4. Inner walls 45, 46, 47, and 48 are joined continuously with rim 44, extending downward therefrom nearly vertically, and at their bottom margins are joined with bottom walls 32, 34, 36, and 38 respectively. The bottom walls 32, 34, 36, and 38, defining the sump 39, slope much more gently toward the middle of the space defined by the walls 40, 41, 42, and 43.

Figure 8:
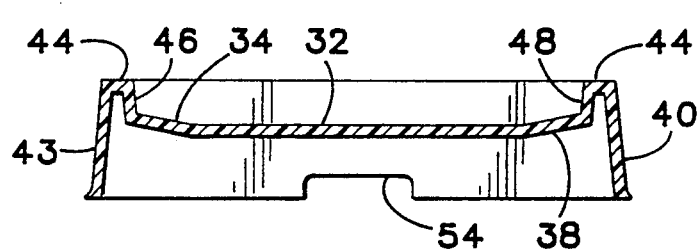
FIG. 8 is a partially schematic view taken along line 8—8 of FIG. 7.
Figure 9:
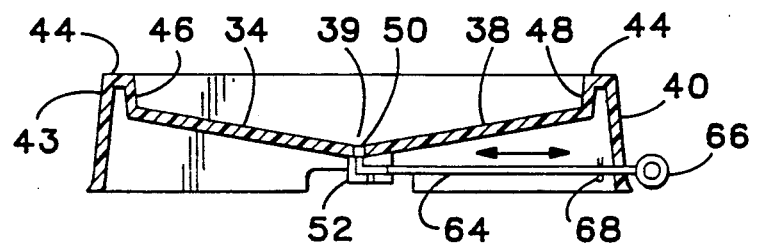
FIG. 9 is a partially schematic view taken along line 9—9 of FIG. 7.

It will be noted in FIGS. 7 and 8 that end walls 42 and 41 define handholds 54 to facilitate conveniently grasping, lifting, and carrying the base 31 with the tray 12 located thereon.

Opening 50, at the lowest point of the sump 39, is closed by a valve 52. When the perforate tray containing non-absorbent litter 16 is supported in place on the base 31 liquid waste deposited on the non-absorbent litter particulate 16 disposed in the perforate tray is free to run off the surfaces of the particulate 16 and drain through the perforate bottom 14 of the tray 12 into the sump 39.

Release of liquid from the sump 39 is controlled by valve 52 which may be preferably manufactured separately from the base and adhesively attached thereto. The top surface 53 of valve 52 is preferably a flat surface suitable for attachment to a correspondingly flat bottom surface surrounding the opening 50 in the sump 39 of base 31. Valve 52 is attached to base 31 such that the upper opening 58 of valve 52 is properly aligned with the opening 50 of sump 39 in base 31.

Figure 10:
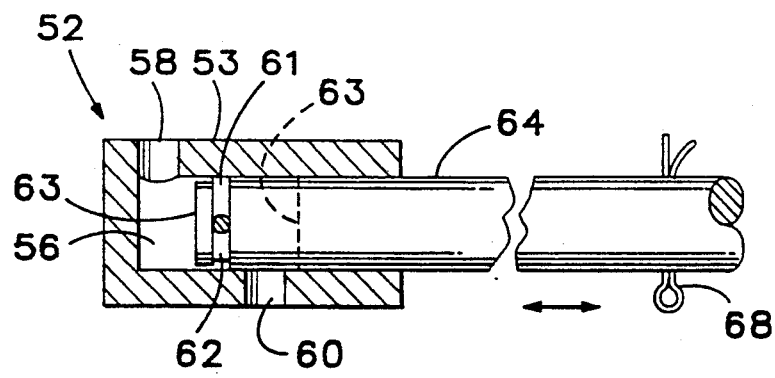
FIG. 10 is a sectional exploded view taken along line 9—9 of FIG. 7, showing the structure of an alternative type of valve suitable for use in an embodiment of the invention.

As best seen in FIG. 10, the valve 52 includes a valve body 56 defining an upper opening 58 and a drain 60. A valve piston has a front face 63. An O-ring 61, shown partially cut-away, is located in a groove 62 in the valve piston, and will prevent the passage of any liquid through the drain 60 when the valve is closed as shown in FIG. 10. When the valve is in the open position, the face 63 of the piston is in the position shown in broken line, and the O-ring is moved laterally in the valve body 56 so that communication between upper opening 58 and the drain opening 60 is unobstructed and any liquid contained in the sump 39 is released through opening 50, through upper opening 58 and thence downward out the drain opening 60. When the valve is closed the O-ring 61 forms a tight seal between upper opening 58 and drain opening 60 preventing any seepage of liquid through drain opening 60. When the valve 52 is open the O-ring 61 prevents seepage of liquid waste along the control rod or shaft 64 toward the control handle 66.

A handle 66 is provided for the operation of the valve and a retainer pin 68 prevents the groove 62 containing an O-ring from being inadvertently removed from the valve body 56. In a preferred embodiment the handle 66 is accessible to the operator at opening 70 in the front wall 40 of the base 31, allowing convenient "push-pull" operation of the valve 52. This arrangement also provides adequate vertical support for the control rod 64. When the base 31 is located on a toilet bowl the handle 66 is readily accessible for easy emptying and flush cleaning of the litter box.

Figure 11:
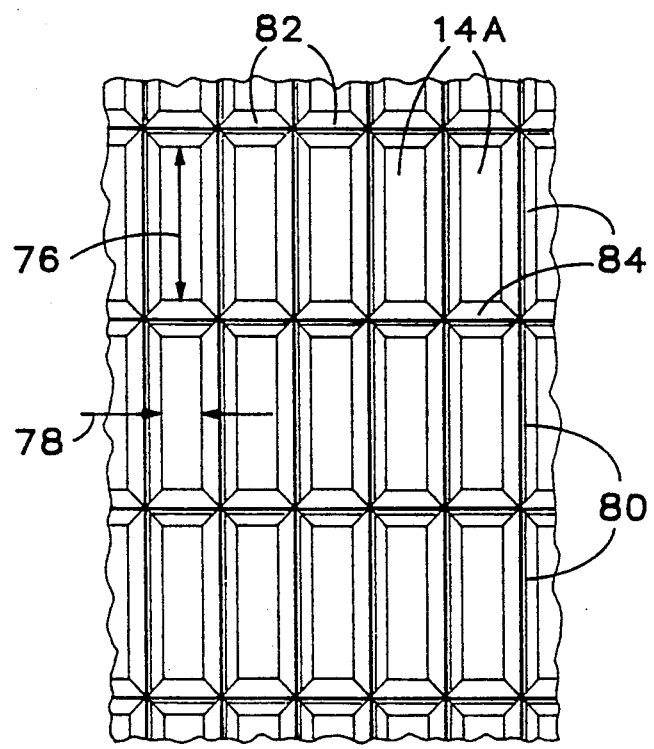
FIG. 11 is a view of a portion of a preferred embodiment of the perforate bottom of the tray forming a part of the invention, taken in the direction indicated by line 11—11 in FIG. 2.

As shown in FIG. 11, the tray bottom 14 of the perforate tray 12 of the present invention may be molded to define regularly spaced openings 14A of a size small enough to prevent the passage of the non-absorbent litter particulate pellets 16 through the openings. Thus, the bottom 14 preferably includes a grid defining openings 14A each having a length 76 of about 0.4 inch and a width 78 of about 0.1 inch. Openings 14A of this size will retain all particles of the litter material 16 having a diameter greater than the width 78 of the grid opening such as particle 16 shown enlarged in FIG. 6.

It will also be noted that bars 80, 82 defining grid openings have knife edges 84 which minimize horizontal areas upon which liquid can collect, thus insuring that all liquid deposited on the litter 16 will drain promptly into the sump 39 below.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A pet litter box, comprising:
   (a) a tray, including an upstanding wall and perforate bottom means for supporting a quantity of litter, said bottom means defining a plurality of openings through which liquid waste is free to pass;
   (b) a base supporting said tray, said base including an upstanding support wall and means for supporting said litter box temporarily in a stable upright position on a toilet bowl with said tray supported on said base;
   (c) sump means, located within said base, for collecting all of said liquid waste which passes through said openings in said bottom means, said sump means having an outlet;
   (d) valve means, associated with said outlet of said sump means, for regulating liquid discharge from said sump means and said base into said toilet bowl; and
   (e) control means, spaced apart from said valve means, for remotely operating said valve means, said control means being located adjacent said means for supporting said base in a position which is accessible when said base is supporting said litter box on said toilet bowl.

2. The pet litter box of claim 1, further including handholds.

3. The pet litter box of claim 2 wherein said upstanding support wall of said base further comprises upstanding front, rear and end walls, and said base further comprises bottom walls respectively extending slopingly downward therefrom toward said means for supporting, said end walls and said bottom walls of said base forming convenient handholds for carrying said litter box and wherein said means for supporting further includes a front and said control means is located on said front.

4. The pet litter box of claim 1, said control means including a handle, and said means for supporting including a base wall having a lower edge defining a horizontal plane corresponding with a planar surface on which said litter box may be supported, said control means being located on said base wall of said base with said handle located in such a location that opening said valve means requires said handle to move through said horizontal plane defined by said lower edge, so that said handle prevents said valve means from being opened when the litter box is in place on a planar surface extending beyond said base wall.

5. The pet litter box of claim 1, further comprising a quantity of non-absorbent litter supported by said tray.

* * * * *